(12) United States Patent
Shin

(10) Patent No.: US 9,423,903 B2
(45) Date of Patent: Aug. 23, 2016

(54) TOUCH SCREEN PANEL

(71) Applicant: LG DISPLAY CO., LTD., Seoul (KR)

(72) Inventor: Seungmok Shin, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 189 days.

(21) Appl. No.: 14/243,593

(22) Filed: Apr. 2, 2014

(65) Prior Publication Data

US 2014/0210790 A1    Jul. 31, 2014

Related U.S. Application Data

(62) Division of application No. 12/960,078, filed on Dec. 3, 2010, now Pat. No. 8,722,313.

(30) Foreign Application Priority Data

Aug. 18, 2010  (KR) .......................... 10-2010-0079689

(51) Int. Cl.
*H05K 7/00* (2006.01)
*G06F 3/041* (2006.01)
*G06F 3/044* (2006.01)

(52) U.S. Cl.
CPC .............. *G06F 3/0412* (2013.01); *G06F 3/044* (2013.01); *G06F 2203/04103* (2013.01); *G06F 2203/04111* (2013.01)

(58) Field of Classification Search
CPC ............ G06F 2203/04103; G06F 2203/04111; G06F 3/0412; G06F 3/044
USPC ................... 361/761, 763, 766, 767, 777, 749
See application file for complete search history.

(56) References Cited

U.S. PATENT DOCUMENTS

| | | | |
|---|---|---|---|
| 2010/0171718 A1* | 7/2010 | Denda ..................... | G06F 3/044 345/173 |
| 2011/0128240 A1* | 6/2011 | Choi ......................... | G02F 1/13 345/173 |
| 2015/0305147 A1* | 10/2015 | Tombs ................. | H05K 1/0296 345/174 |
| 2015/0338950 A1* | 11/2015 | Ningrat ............... | G06F 3/03545 345/174 |

FOREIGN PATENT DOCUMENTS

| | | | |
|---|---|---|---|
| CN | 101324827 | | 12/2008 |
| CN | 101441545 | | 5/2009 |
| CN | 201298221 | | 8/2009 |
| KR | 10-2008-0096977 | | 11/2008 |
| KR | 10-2009-0122586 | | 12/2009 |
| KR | 20110061153 | * | 6/2011 |

* cited by examiner

*Primary Examiner* — Yuriy Semenenko
(74) *Attorney, Agent, or Firm* — Dentons US LLP

(57) ABSTRACT

A capacitive touch screen panel includes a substrate, a plurality of first electrode serials arranged in parallel in a first direction, a plurality of second electrode serials arranged in parallel intersecting the first electrode serials, a plurality of first routing wires, a plurality of second routing wires and an insulation layer that electrically insulates the first electrode serials from the second electrode serials, wherein each of the first electrode serials includes a plurality of first electrode patterns and a plurality of first connection patterns, and wherein a first conductive layer of the first routing wire, a first conductive layer of the second routing wire, and the first connection patterns are formed in the same layer.

8 Claims, 15 Drawing Sheets

TOUCH SCREEN PANEL

This application is a Divisional Application, and claims the benefit and priority, of U.S. patent application Ser. No. 12/960,078 filed Dec. 3, 2010, now U.S. Pat. No. 8,722,313, and Korea Patent Application No. 10-2010-0079689 filed on Aug. 18, 2010, the entire contents of which are incorporated herein by reference for all purposes as if fully set forth herein.

BACKGROUND

1. Field

Embodiments of this invention relate to a touch screen panel.

2. Related Art

In recent years, along with the development of the electronics industry, display devices, such as a liquid crystal display, an electroluminescent display, and a plasma display panel having a quick response speed, low power consumption, and an excellent color reproduction rate, have been in the spotlight. The display device is used for various electronic products such as televisions, monitors for computers, notebook computers, mobile telephones, display units for refrigerators, personal digital assistants, automated teller machines, and the like. In general, the display device interfaces with various input devices such as a keyboard, a mouse, and a digitizer. However, when a separate input device such as a keyboard, a mouse, or digitizer is used, a user is required to know how to use the separate input device, and as the separate input device occupies space, customer dissatisfaction is increased. Therefore, there is increasingly a need for a convenient and simple input device that can reduce erroneous operation. Also, there is a need for a touch screen panel in which a user can input information by directly contacting a screen with a finger or a pen.

Since the touch screen panel has a simple configuration, which minimizes erroneous operations, the user can perform an input action without a separate input device, and can quickly and easily manipulate through contents displayed on a screen.

Touch screen panels are classified into a resistive type, a capacitive type, an electromagnetic type according to a detection method of a touched portion. The resistive type touch screen panel determines a touched position by a voltage gradient according to a change of resistance in a state where a DC voltage is applied to metal electrodes formed on an upper plate or a lower plate. The capacitive type touch screen panel senses a touched position according to a difference in capacitance created in an upper or lower plate when the user physically contacts with a conductive film formed on the upper or lower plate. The electromagnetic type touch screen panel detects a touched portion by reading an LC value induced as an electromagnetic pen touches a conductive film.

Hereinafter, a capacitive type touch screen panel in the related art will be described with reference to FIGS. 1 and 2. FIG. 1 is a plan view illustrating a capacitive type touch screen panel in the related art, and FIG. 2 is a sectional view taken along the lines I-I', II-II' and III-III' in the touch screen panel shown in FIG. 1.

Referring to FIGS. 1 and 2, the capacitive type touch screen panel in the related art includes an electrode forming part 20, a routing wire forming part 40, a pad forming part 60, and a protective layer 50.

The electrode forming part 20 is formed on a substrate 10 and includes a plurality of first electrodes 21 arranged in parallel in a first direction (for example, an X-axis direction) and a plurality of second electrodes 22 arranged to intersect in a direction (for example, a Y-axis direction) perpendicular to the first electrodes 21. The first electrodes 21 and the second electrodes 22 intersect each other, but sustain an electrical insulation state by an insulation layer 30. Further, neighboring first electrodes 21 arranged in the first direction are connected to each other by a bridge 41. That is, the bridge 41 connects the neighboring first electrodes 21 to each other through contact holes 30a and 30b formed in the insulation layer 30 covering the first and second electrodes 21 and 22.

The routing wire forming part 40 is formed on the substrate 10 at positions outside the electrode forming part 20 and includes a plurality of first routing wires 42 connected to the plurality of first electrodes 21, respectively, and a plurality of second routing wires 43 connected to the plurality of second electrodes 22, respectively.

The pad forming part 60 includes a plurality of first pads 61 connected to the plurality of first electrodes 21 through the plurality of first routing wires 42, respectively, and a plurality of second pads 62 connected to the plurality of second electrodes 22 through the plurality of second routing wires 43, respectively.

The protective layer 50 covers the electrode forming part 20 and the routing wire forming part 40 and prevents the first and second electrodes 21 and 22 and the first and second routing wires 42 and 43 from being exposed to the outside environment.

Hereinafter, a method of manufacturing a capacitive type touch screen panel in the related art will be described with reference to FIGS. 3A to 3D.

Referring to FIG. 3A, a first conductive layer for forming first and second electrodes is entirely deposited on the substrate 10 including three parts corresponding to an electrode forming part 20, a routing wire forming part 40, and the pad forming part 60 through a deposition process such as a sputtering method. As the first conductive layer, an indium tin oxide (ITO) layer is generally used. After a photoresist is coated on the substrate 10 on which the first conductive layer is formed, a first photoresist pattern for exposing the first conductive layer is formed in the electrode forming part 20 by performing a photolithography process using a first photomask. After removing the first conductive layer exposed by the first photoresist pattern through wet etching, a plurality of first electrodes 21 and a plurality of second electrodes 22 intersecting the first electrodes 21 are formed on the substrate 10 by ashing the remaining first photoresist pattern.

In FIG. 3B, the first insulation layer 30 is formed on a portion of the substrate 10 on which the plurality of first and second electrodes 21 and 22 are formed, then the first insulation layer 30 on the pad forming part 60 and the routing wire forming part 40 is removed and first and second contact holes 30a and 30b penetrating the first insulation layer 30 on the electrode 21 are formed through a photolithography process and an etching process using a second photomask. The first and second contact holes 30a and 30b expose a portion of the neighboring first electrodes 21. The first insulation layer 30 includes silicon nitride, silicon oxide, or organic resin.

Referring to FIG. 3C, a second conductive layer is formed on an entire surface of the substrate 10 on which the first and second contact holes 30a and 30b are formed through a deposition process such as a sputtering method. The second conductive layer includes aluminum (Al) or molybdenum (Mo). After coating a photoresist on the substrate on which the second conductive layer is formed, first and second routing wires 42 and 43 are formed in a routing wire forming part on the substrate 10, a connection electrode 41 is formed on the first insulation layer 30 of the electrode forming part 20, and first pads 61 and second pads 62 are formed in a pad forming part on the substrate 10 by performing a photolithography process and an etching process using a third photomask. The connection electrode connects the neighboring first electrodes 21 to each other through the first and second contact holes 30a and 30b formed in the first insulation layer 30.

In FIG. 3D, a second insulation layer 50 as a protective film is formed on an entire surface of the substrate 10 on which the connection electrode 41 and the first and second routing wires 42 and 43 are formed, then through holes 50a, 50b and 50c for penetrating the second insulation layer 50 is formed to expose the first and second pads 61 and 62 with a photolithography process and an etching process using a fourth photomask.

However, the capacitive type touch screen panel in the related art is manufactured using four—photomask processes, as described above, and each photomask process accompanies a photolithography process requiring a series of continuous processes, such as photoresist (PR) coating, photomask alignment, PR exposure, PR development, and PR cleaning, and thus it is necessary to reduce the number of photomask processes in terms of time and costs.

SUMMARY

According to an embodiment of this invention, there is provided a capacitive touch screen panel including a substrate; a plurality of first electrode serials arranged in parallel in a first direction; a plurality of second electrode serials arranged in parallel intersecting the first electrode serials; a a plurality of first routing wires and a plurality of second routing wires that are formed on the substrate at positions outside the plurality of first electrode serials and the plurality of second electrode serials, wherein the plurality of first routing wires are respectively connected to the plurality of first electrode serials and have a double layer structure of first and second conductive layers, and the plurality of second routing wires are respectively connected to the plurality of second electrode serials and have a double layer structure of the first and second conductive layers; and an insulation layer that electrically insulates the first electrode serials from the second electrode serials at an intersection of the first electrode serials and the second electrode serials, wherein each of the plurality of first electrode serials includes a plurality of first electrode patterns separated from each other and a plurality of first connection patterns, each of the first electrode patterns is formed on ends opposite to each other of the neighboring first connection patterns and is formed on the substrate between the ends, and the neighboring first electrode patterns are connected to each other via the first connection patterns respectively, and the plurality of first connection patterns are formed of the first conductive layer and are separately from each other, wherein the first conductive layer of the first routing wire, the first conductive layer of the second routing wire, and the first connection patterns are formed in the same layer, wherein each of the plurality of second electrode serials includes a plurality of second connection patterns and a plurality of second electrode patterns, the neighboring second electrode patterns are electrically connected to each other via the second connection patterns respectively, and wherein the first electrode patterns and the plurality of second electrode serials are formed of a third conductive layer.

In the above-described method and configuration, the first and third conductive layers may include one of ITO and IZO, and the second conductive layer may include one of Al, AlNd, Mo, MoTi, Cu, CuOx, and Cr.

It is apparent to those skilled in the art that various modifications, variations and combinations can be made based on the above content.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
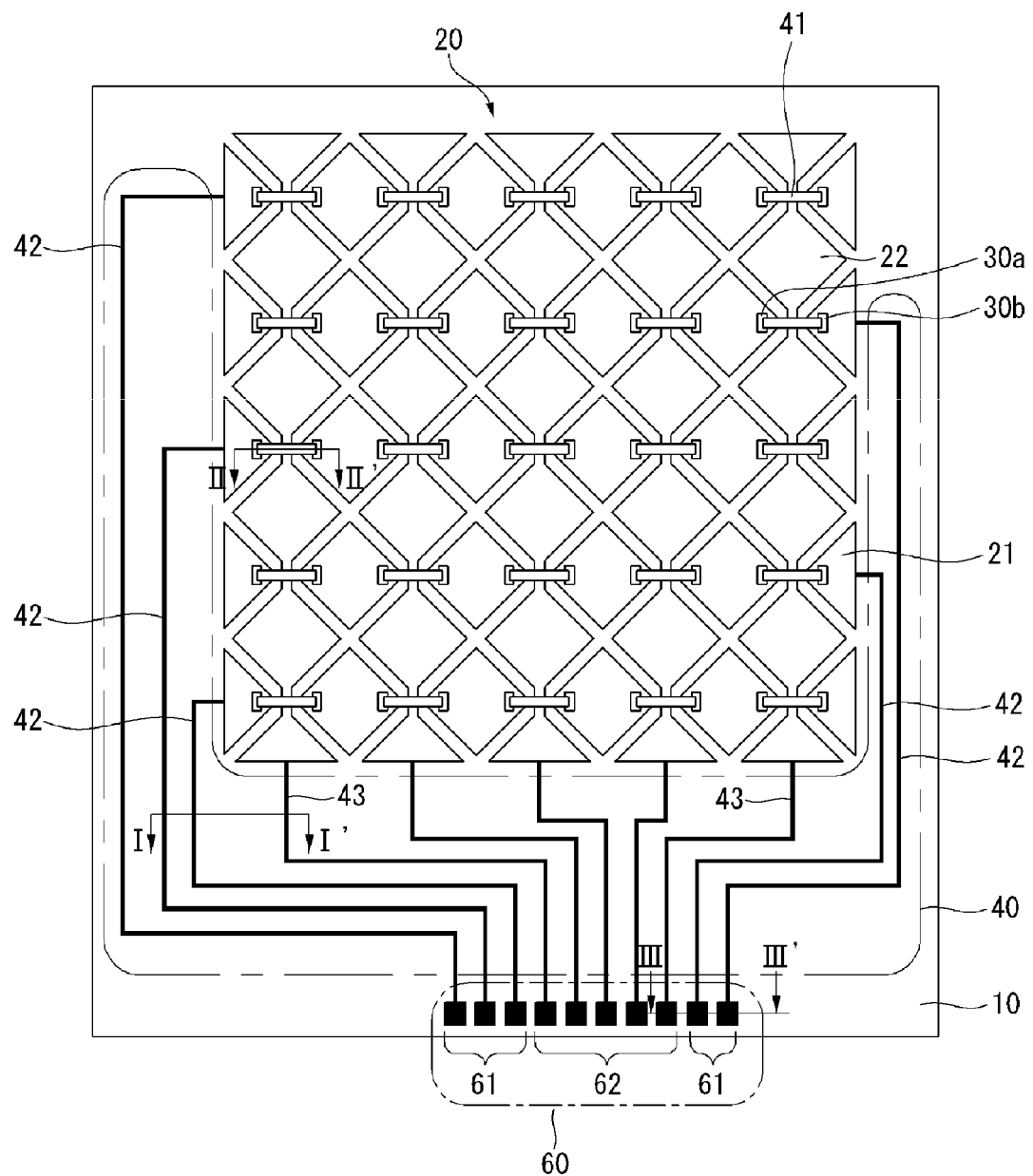
FIG. 1 is a plan view illustrating a capacitive type touch screen panel in the related art.
Figure 2:
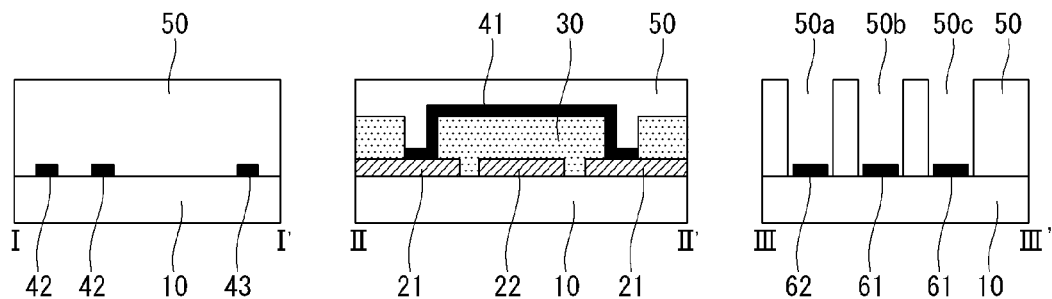
FIG. 2 is a sectional view taken along the lines I-I', II-II' and III-III' in the touch screen panel shown in FIG. 1.
Figure 3A:
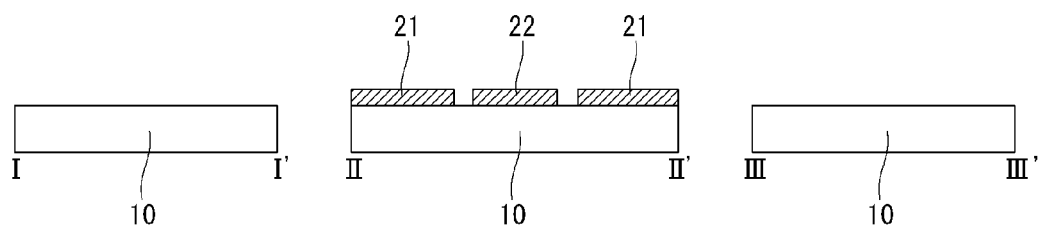
FIGS. 3A to 3D are sectional views illustrating a process of manufacturing the touch screen panel in the related art shown in FIG. 1.
Figure 3B:
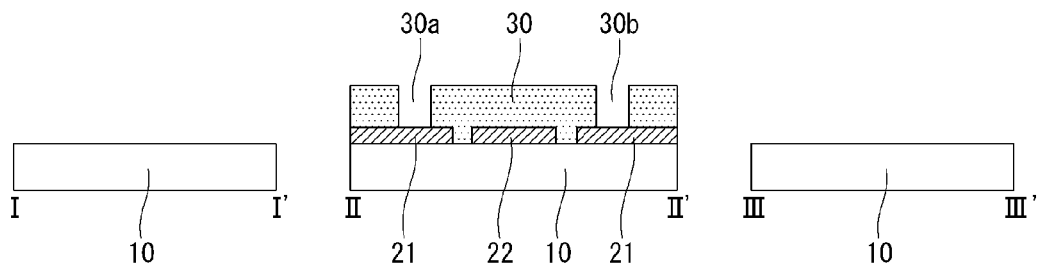
Figure 3C:
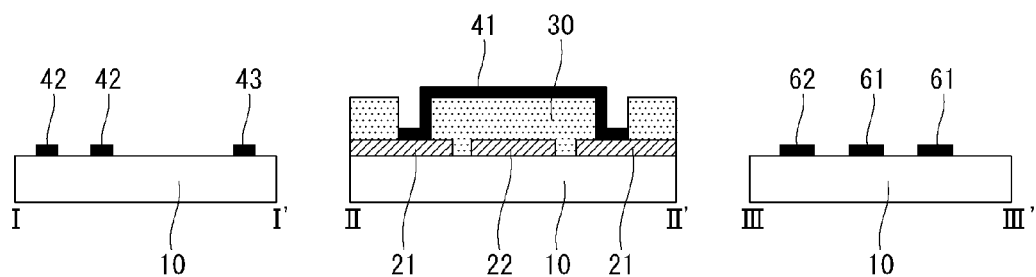
Figure 3D:
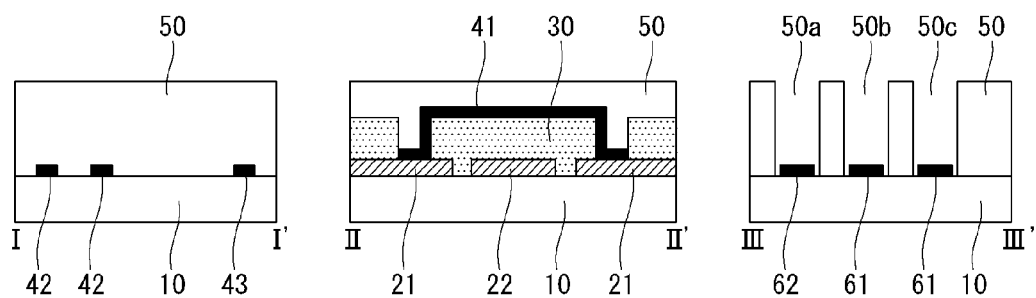

Hereinafter, embodiments of this document will be described in detail with reference to the accompanying drawings. Like reference numerals designate like elements throughout the specification. In the following description, when a detailed description of well-known functions or configurations related to this document is determined to unnecessarily cloud a gist of the present invention, the detailed description thereof will be omitted.

Names of the respective elements used in the following description are selected for convenience of writing the specification and may be thus different from those in actual products.

Figure 4:
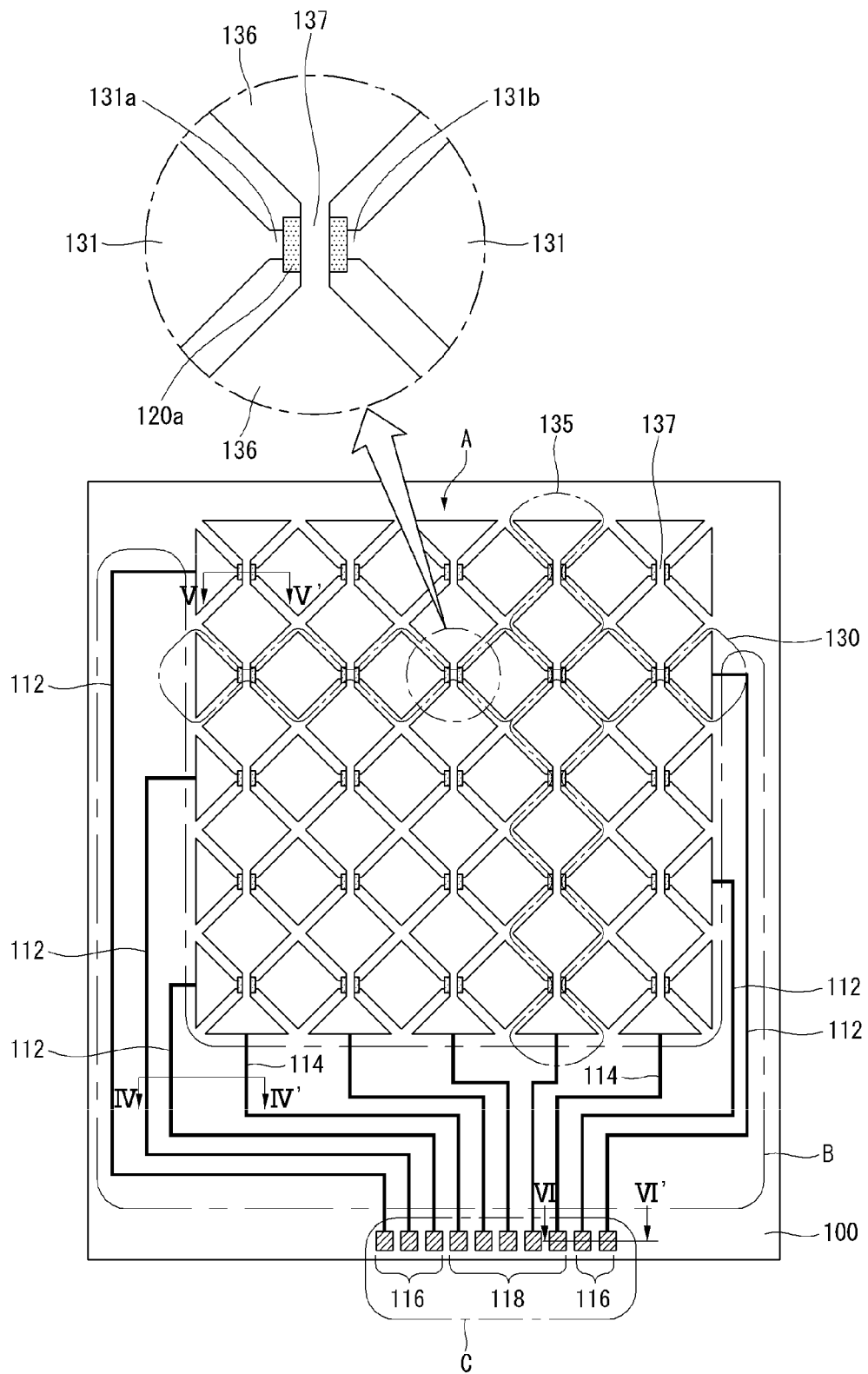
FIG. 4 is a plan view of a touch screen panel according to an embodiment of this invention.

A capacitive touch screen panel according to an embodiment of this invention will be described with reference to FIGS. 4, 5A and 5B. FIG. 4 is a plan view illustrating the touch screen panel according to the embodiment of this invention, and FIGS. 5A and 5B are sectional views taken along the lines IV-IV', V-V' and VI-VI' in the touch screen panel in FIG. 4.

Figure 5A:
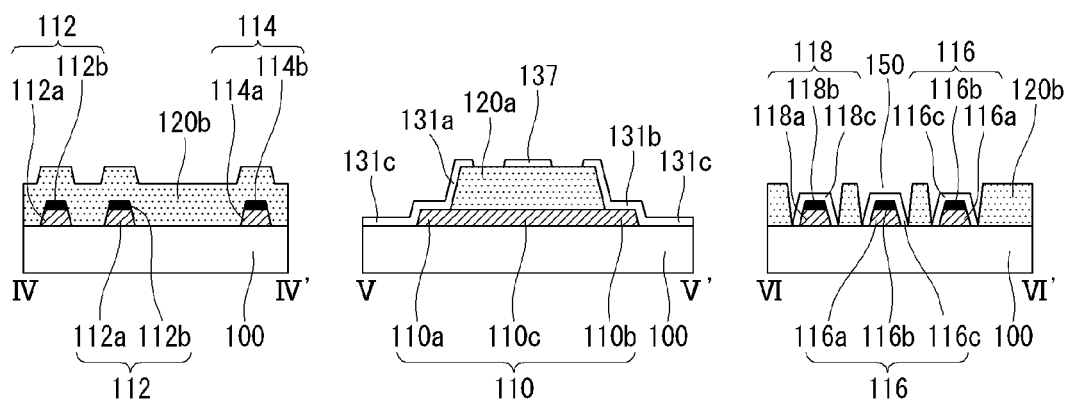
FIGS. 5A and 5B are sectional views taken along the lines IV-IV', V-V' and VI-VI' in the touch screen panel shown in FIG. 4 according to the embodiment of this invention.
Figure 5B:
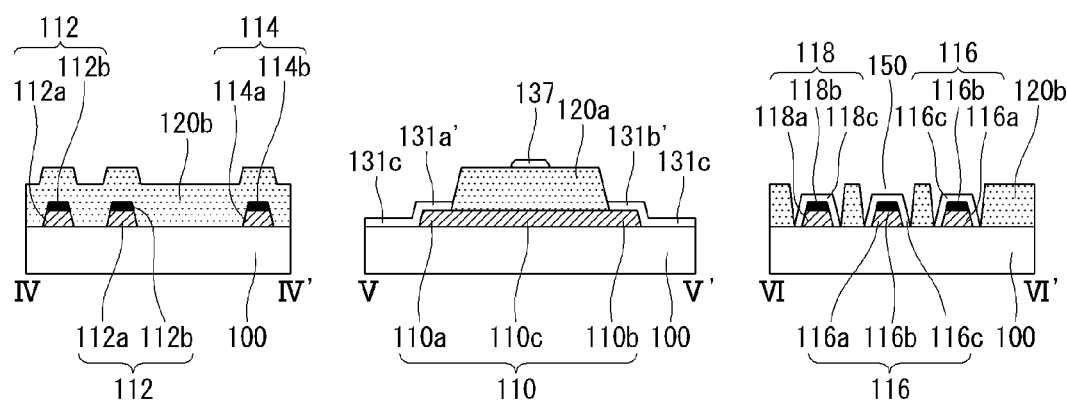

Referring to FIGS. 4, 5A and 5B, the touch screen panel according to the embodiment of this invention includes an electrode forming part A, a routing wire forming part B, and a pad forming part C.

The electrode forming part A includes a plurality of first electrode serials 130 optionally arranged in parallel in a first direction (for example, an X-axis direction) and a plurality of second electrode serial 135 optionally arranged in parallel in a second direction (for example, an Y-axis direction) to intersect with the first direction. The first electrode serials 130 may also be referred to as first serial electrodes 130 since of their serial or linear repeating pattern of polygonal element. Similarly, the second electrode serials 135 may also be referred to as second serial electrodes 135 since of their serial or linear repeating pattern of polygonal elements. Each of the first electrode serials 130 may include first electrode patterns 131 having a triangle, a rectangle, a square, a quadrangle, a diamond shape, a polygonal shape, or the like, and first connection patterns 110 for connecting neighboring first electrode patterns 131. Each of the second electrode serials 135 may include second electrode patterns 136 having a triangle, a rectangle, a square, a quadrangle, a diamond shape, a polygonal shape, or the like, which may be similar to the first electrode patterns 131 and second connection patterns 137 for connecting neighboring second electrode patterns 136. Also, the first connection patterns 110 are formed separately from the first electrode patterns 131, and the second connection patterns 137 are integrally formed with the second electrode patterns 136.

The routing wire forming part B is formed on the substrate 100 at positions outside the electrode forming part A, and includes a plurality of first routing wires 112 connected to the plurality of first electrode serials 130, respectively, and a plurality of second routing wires 114 connected to the plurality of second electrode serials 135, respectively.

The pad forming part C includes a plurality of first pads 116 connected to the plurality of first electrode serials 130 through the plurality of first routing wires 112, respectively, and a plurality of second pads 118 connected to the plurality of second electrode serials 135 through the plurality of second routing wires 114, respectively.

In the touch screen panel according to the embodiment of this invention, the first connection patterns 110 are made of a transparent conductive material such as ITO. The first and second routing wires 112 and 114 include lower layers 112a and 114a made of a transparent conductive material such as ITO and upper layers 112b and 114b made of a metal material such as Al, AlNd, Mo, MoTi, Cu, CuOx, or Cr. The first and second pads includes first layers 116a and 118a made of transparent conductive material such as ITO, second layers 116b and 118b made of a metal material such as Al, AlNd, Mo, MoTi, Cu, CuOx, and Cr, and third layers 116c and 118c made of transparent conductive material such as ITO or IZO. Since the metal materials forming the upper layers 112b and 114b of the first and second routing wires 112 and 114, and the second layers 116b and 118b of the first and second pads 116 and 118 have a low resistivity, it is possible to lower contact resistance between the first and second electrode patterns 131 and 136 and the first connection pattern 110 or routing wires 112 and 114. Although the first and second pads 116 and 118 have a triple layer structure in the embodiment of this invention, the second layers 116b and 118b may be omitted.

Further, in this embodiment, the first connection patterns 110, the lower layers 112a and 114a and the upper layers 112b and 114b of the first and second routing wires 112 and 114, and the first layers 116a and 118a and the second layers 116b and 118b of the first and second pads 116 and 118 are formed through one same photomask process using a halftone photomask process. As such, since the first connection patterns 110 and the first and second routing wires 112 and 114 are formed through the same photomask process, one photomask process can be omitted, compared with the related art that forms a connection pattern for connecting electrode patterns and routing wires in two photomask processes. Accordingly, it is possible to reduce a cost and a tact time (i.e., manufacturing time required per product unit for achieving a daily production target amount).

In the electrode forming part A of the touch screen panel, first insulation patterns 120a are formed on central parts 110c of the first connection patterns 110 to expose first parts 110a and second parts 110b of the first connection patterns 110 and prevents the first connection patterns 110 and the second connection patterns 137 from coming into contact with each other. Central parts 131c of the first electrode patterns 131 are formed on the substrate 100, but, as shown in FIG. 5A, first parts 131a of the first electrode patterns 131 are formed on the first parts 110a of the first connection patterns 110, and on lateral sides and a portion of upper surfaces of the first insulation patterns 120a, and second parts 131b of the first electrode patterns 131 are formed on the second parts 110b of the first connection patterns 110, on lateral sides and a portion of upper surfaces of the first insulation patterns 120a. Alternatively, as shown in FIG. 5B, first parts 131a' of the first electrode patterns 131 may be formed on only the first parts 110a of the first connection patterns 110, and second parts 131b' of the first electrode patterns 131 may be formed on only the second parts 110b of the first connection patterns 110. Therefore, the neighboring first electrode patterns 131 are electrically connected to each other via the first connection patterns 110.

The first and second electrode patterns 131 and 136 and the second connection patterns 137, which are formed in the electrode forming part A, are made of the same material through the same process. The first and second electrode patterns 131 and 136 and the second connection patterns 137 are made of a transparent metal material such as ITO or IZO. Since the first and second electrode patterns 131 and 136 and the second connection patterns 137 using ITO or IZO are formed in a topmost layer of the touch screen panel and ITO or IZO has very high hardness, a scratch does not occur in a subsequent process of forming a display device on the other surface of the substrate 100 of the touch screen panel, and thus a touch screen panel having good quality is obtained.

Second insulation patterns 120b are formed in the routing wire forming part B so as to expose end parts (not shown) of the first routing wires 112 and end parts (not shown) of the second routing wires 114. A portion of the first electrode patterns 131 positioned at the outermost of the electrode forming part A are formed on the exposed end parts of the first routing wires 112. Similarly, a portion of the second electrode patterns 136 positioned at the outermost of the electrode forming part A are formed on the exposed end parts of the second routing wires 114.

In addition, as shown in FIG. 5A, in the pad forming part C, the second insulation patterns 120b having contact holes 150 which expose the first pads 116 and the second pads 118 are formed. Each of the first pads 116 includes the first layer 116a made of transparent conductive material such as ITO and the second layer 116b made of a metal material such as Al, AlNd, Mo, MoTi, Cu, CuOx, and Cr, which are formed sequentially. Each of the second pads 118 includes the first layer 118a and the second layer 118b which are made of the same material as those of the first pads.

In a structure shown in FIG. 5A, the first and second parts 131a and 131b of the first electrode pattern 131 are formed on the first and second parts 110a and 110b of the first connection pattern 110. Furthermore, the first and second parts 131a and 131b of the first electrode pattern 131 are formed lateral sides and upper surface of the first insulation patterns 120a. Therefore, a misalignment margin between a photomask and a substrate of the touch screen panel can be secured as much as a length of the lateral sides and the upper surface of the first insulation patterns 120a. Accordingly, although misalignment exists at a process of patterning the first and second electrode patterns 131 and 136, it is possible to appropriately assure electrical contact between the first electrode patterns 131 and the first connection pattern 110.

Hereinafter, a method of manufacturing a capacitive type touch screen panel according to the embodiment of this invention will be described with reference to FIGS. 6A to 8D.

FIGS. 6A to 6G are a plan view and sectional views illustrating a first process using a half-tone photomask of processes of manufacturing the touch screen panel according to the embodiment of this invention.

Referring to FIGS. 6A to 6G, a first conductive pattern group including first connection patterns 110 having a single layer structure, first routing wires 112 and second routing wires 114 having a double layer structure, and first pads and second pads having a double layer structure is formed on the substrate 100 including three parts corresponding to the electrode forming part A, the routing wire forming part B, and the pad forming part C using the half-tone photomask process.

Figure 6A:
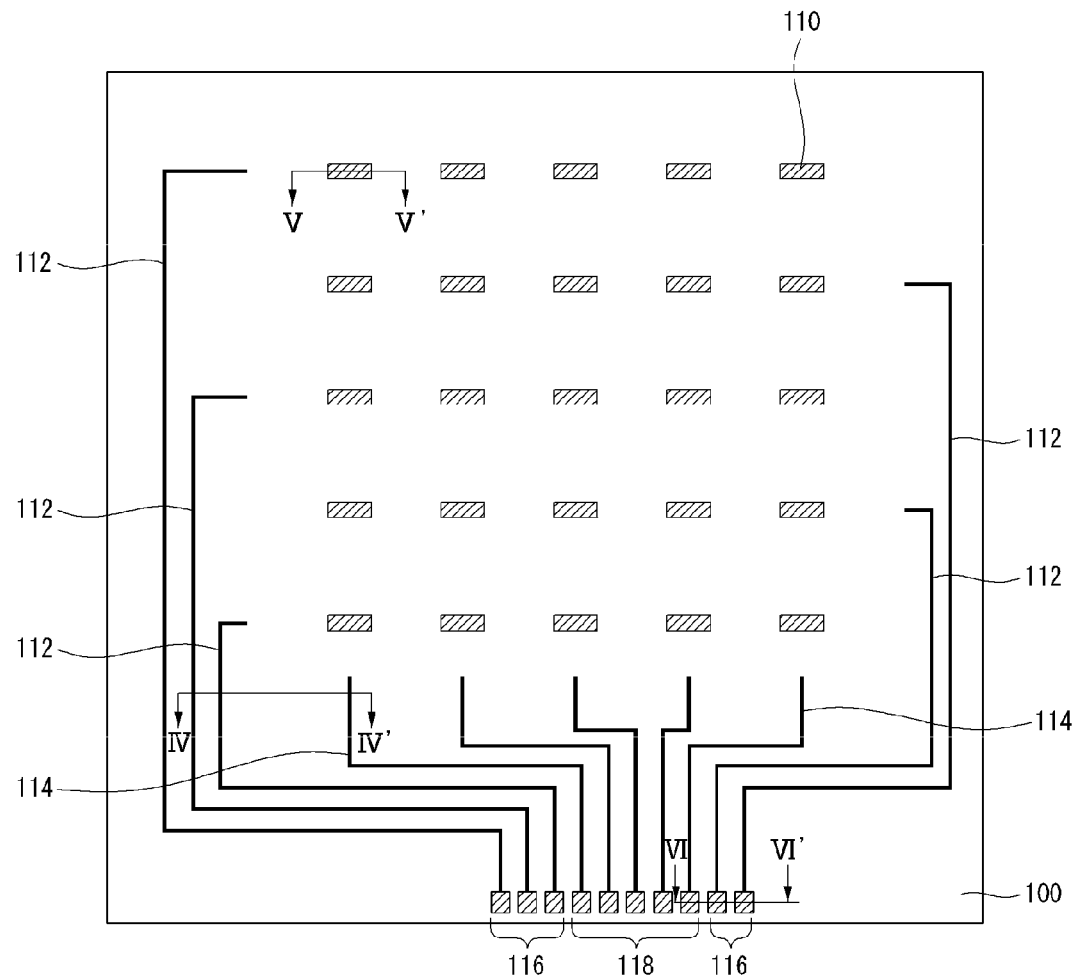
FIGS. 6A to 6G are a plan view and sectional views illustrating a first process using a half-tone photomask of processes of manufacturing the touch screen panel shown in FIG. 4 according to the embodiment of this invention.
Figure 6B:
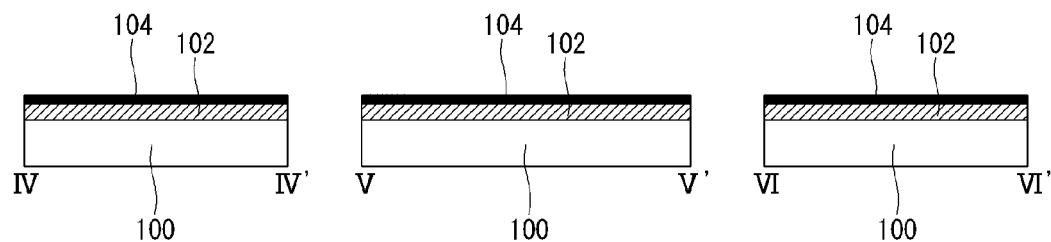

Specifically, as shown in FIG. 6B, a first conductive layer 102 and a second conductive layer 104 are sequentially entirely deposited on the substrate 100 through a deposition process such as a sputtering method. Here, the first conductive layer 102 is made of ITO or IZO, and the second conductive layer 104 is made of one of Al, AlNd, Mo, MoTi, Cu, CuOx, Cr, ITO and so on.

Figure 6C:
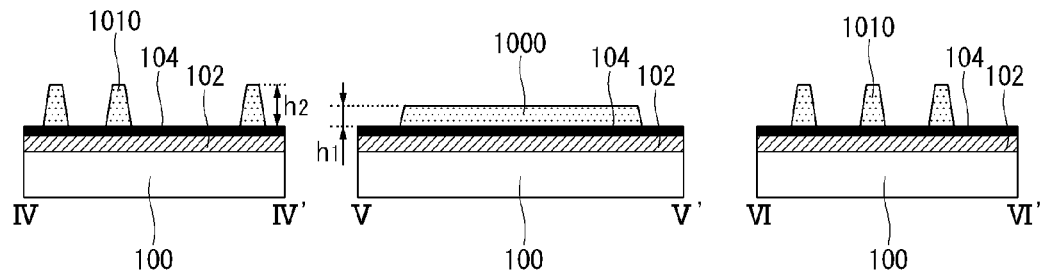

After the first and second conductive layers 102 and 104 are formed on the substrate 100, as shown in FIG. 6C, a (1-1)-th photoresist pattern 1000 having a first height h1 and a (1-2)-th photoresist patterns 1010 having a second height h2 greater than the first height h1 are formed through a photolithography process using the half-tone photomask. The (1-1)-th photoresist pattern 1000 is disposed on the electrode forming part A in which later-described first connection patterns, and the (1-2)-th photoresist patterns 1010 are disposed on the routing wire forming part B and the pad forming part C.

Figure 6D:
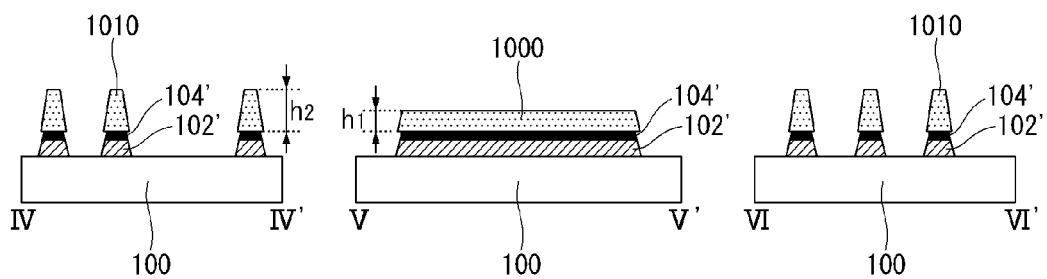

Next, the first and second conductive layers 102 and 104 are exposed and developed using the (1-1)-th and (1-2)-th photoresist patterns 1000 and 1010 as a photomask, and the first and second conductive layers 102 and 104 at parts where the (1-1)-th photoresist pattern and (1-2)-th photoresist patterns are not positioned are removed by wet etching, thereby forming the first conductive pattern group including first conductive patterns 102' and second conductive patterns 104' as shown in FIG. 6D. When the first and second conductive layers 102 and 104 are etched, the first conductive pattern group may have an under-cut structure by over-etching the first and second conductive layers 102 and 104 such that the (1-1)-th and the (1-2)-th photoresist patterns 1000 and 1010 are easily removed in a subsequent process.

Figure 6E:
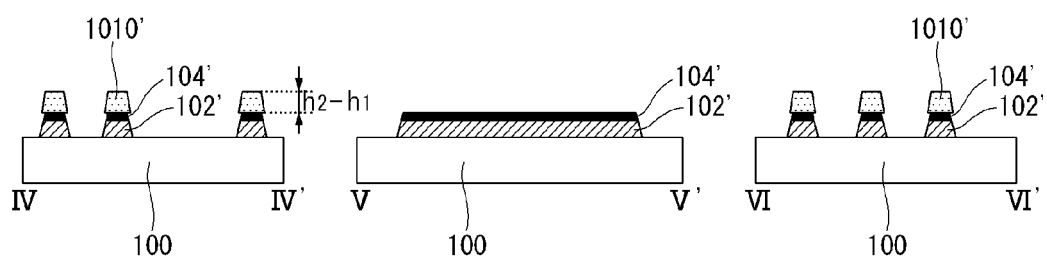

Successively, as shown in FIG. 6E, the (1-1)-th photoresist pattern 1000, which is disposed at a part where first connection patterns will be formed, is removed through an ashing process using oxygen plasma so as to expose the second conductive pattern 104'. At this time, the height of the (1-2)-th photoresist patterns 1010 on the routing wire forming part B and the forming pad part C is reduced by the height h1 to thereby become a (1-3)-th photoresist patterns 1010' having a height of a difference h2−h1.

Figure 6F:
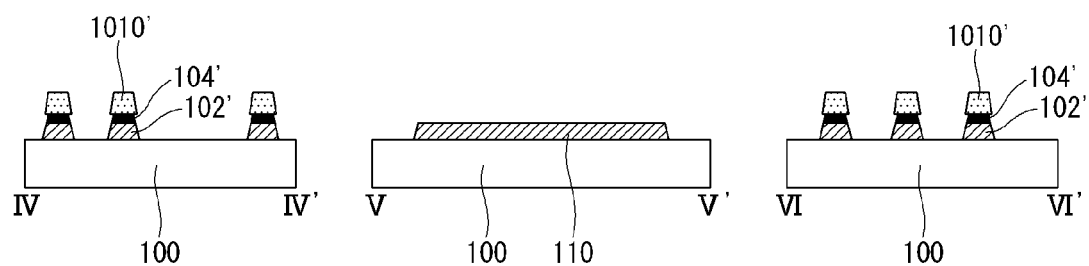

As shown in FIG. 6F, the second conductive layer 104' on the electrode forming part A is removed by wet etching, using the (1-3)-th photoresist pattern 1010' which decreases in its height as a photomask, thereby forming a first connection pattern 110 of the first conductive pattern 102'.

Figure 6G:
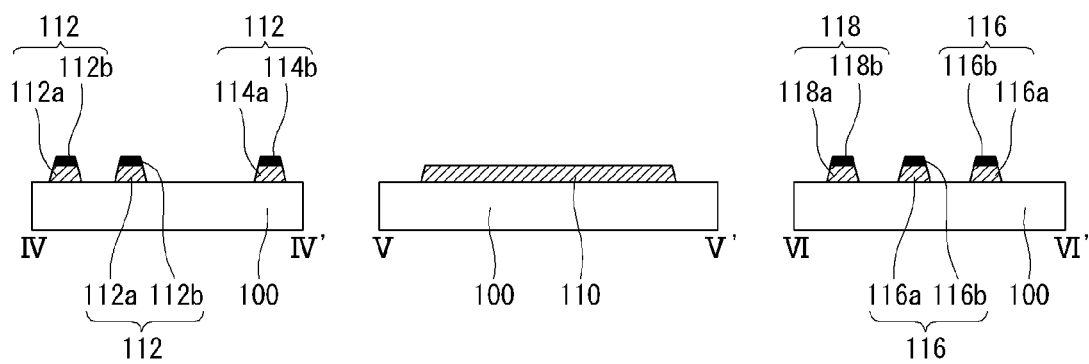

Next, the (1-3)-th photoresist pattern 1010' is removed by lift-off, and thereby, as shown in FIG. 6G, there is formation of first and second routing wires 112 and 114 having a double layer structure, a first connection pattern 100 having a signal layer structure, and first and second pads 116 and 118 having a double layer structure. Here, the first connection pattern 110 is made of a transparent conductive material such as ITO. The first and second routing wires 112 and 114 include lower layers 112a and 114a made of a transparent conductive material such as ITO and upper layers 112b and 114b made of a metal material such as Al, AlNd, Mo, MoTi, Cu, CuOx, or Cr. The first and second pads includes first layers 116a and 118a made of transparent conductive material such as ITO, and second layers 116b and 118b made of a metal material such as Al, AlNd, Mo, MoTi, Cu, CuOx, or Cr.

Figure 7A:
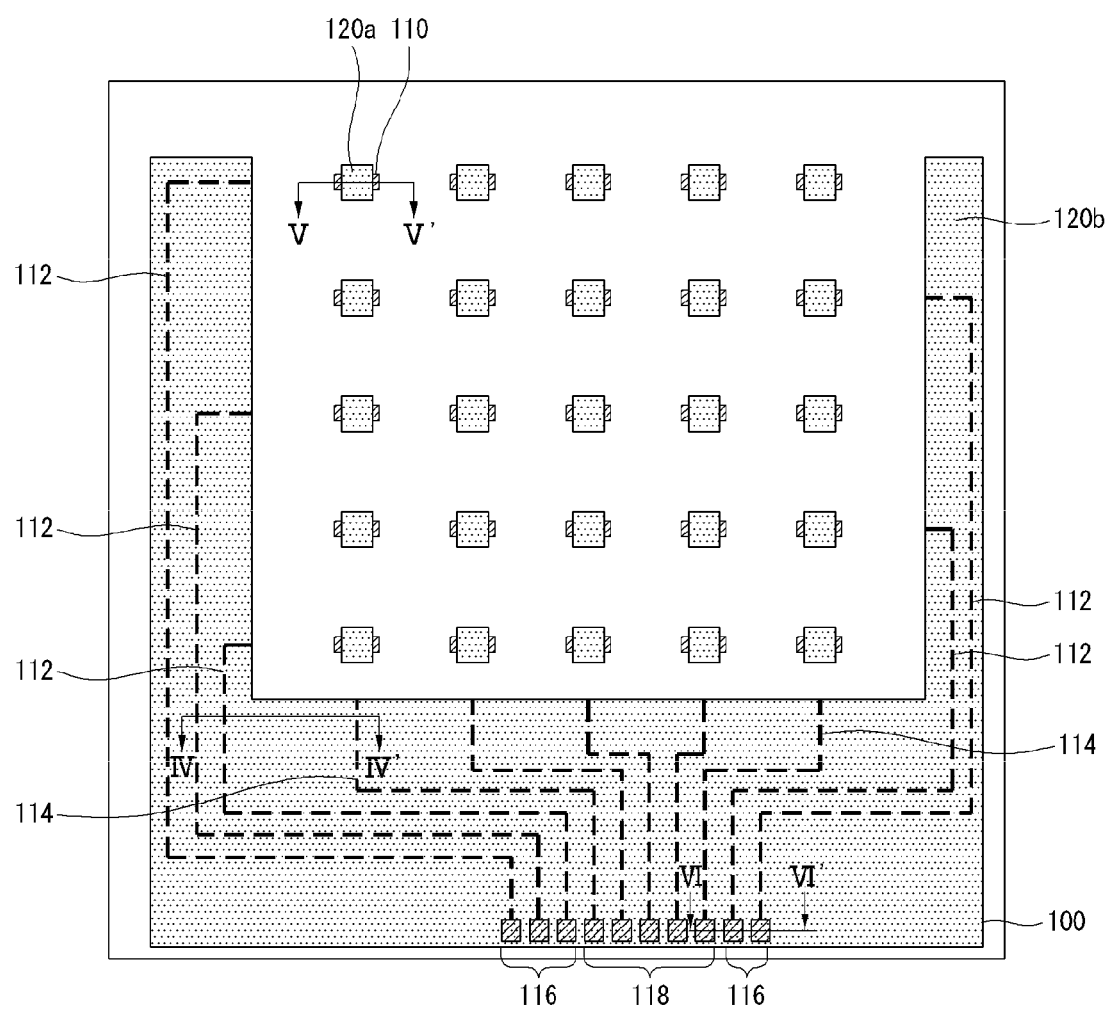
FIGS. 7A to 7D are a plan view and sectional views illustrating a second process of processes of manufacturing the touch screen panel shown in FIG. 4 according to the embodiment of this invention.

FIGS. 7A to 7D are a plan view and sectional views illustrating a second process of processes of manufacturing the touch screen panel according to the embodiment of this invention. Since the first and second routing wires 112 and 114 marked with dotted lines in FIG. 7A are covered by the second insulation pattern 120b, the first and second routing wires 112 and 114 are parts which are not exhibited in the plan view; however, for a better understanding, in this invention, the first and second routing wires 112 and 114 are marked with the dotted lines.

Figure 7B:
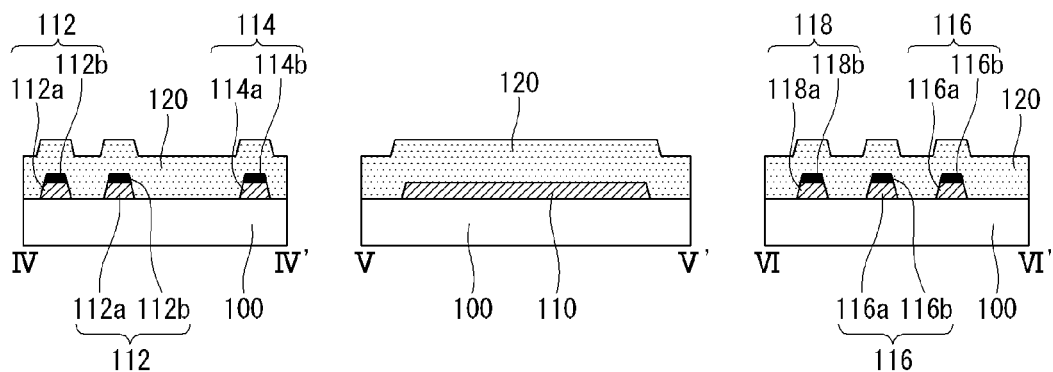

Referring to FIGS. 7A and 7B, the insulation layer 120 is formed by a deposition method such as sputtering on an entire surface of the substrate 100 provided with the first conductive pattern group including the first connection patterns 110, the first routing wires 112, the second routing wires 114, the first pads 116, and the second pads 118. As a material of the insulation layer 120, an inorganic insulation material such as silicon nitride (SiNx) or silicon oxide is used; however, an organic insulation material such as photo acryl may be used.

Figure 7C:
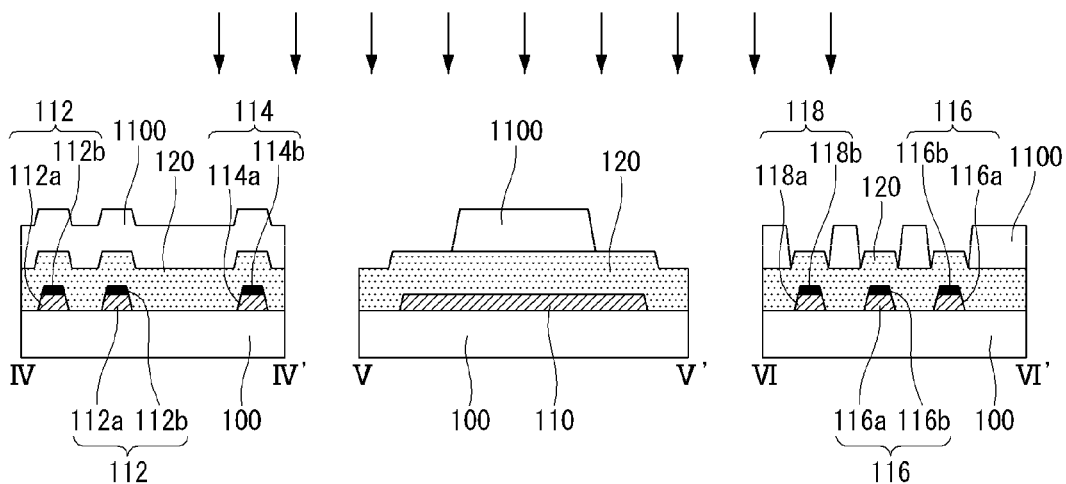
Figure 7D:
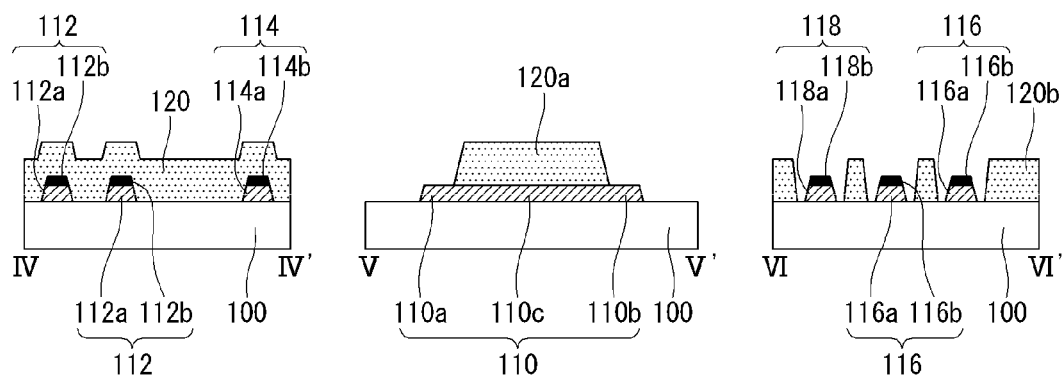

After the insulation layer 120 is formed, as shown in FIG. 7C, a photoresist pattern 1100 is formed on a part in which the insulation layer 120 should exist by a photolithography process using a second photomask. The photoresist pattern 1100 is positioned on the insulation layer 120, thereafter the insulation layer 120 is exposed and developed using the photoresist pattern as a photomask, and patterned by dry etching, thereby respectively forming the first insulation patterns 120a and the second insulation patterns 120b, as shown in FIG. 7D. In other words, as shown in FIG. 7D, in the electrode forming part A, the first insulation pattern 120a is formed on the central part 110c of the first connection pattern 110 so as to expose the first part 110a and the second part 110b of the first connection pattern 110, and in the routing wire forming part B, the second insulation pattern 120b is formed so as to expose a portion of the first and second routing wires 112 and 114. In the pad forming part C, the second insulation pattern 120b is formed so as to expose the lower layers 116a and 118a of the first and second pads 116 and 118.

When the insulation layer 120 is etched, the first and second insulation patterns 120a and 120b may have an under-cut structure by over-etching the insulation layer 120 such that the photoresist pattern 1100 are easily removed in a subsequent process.

Figure 8A:
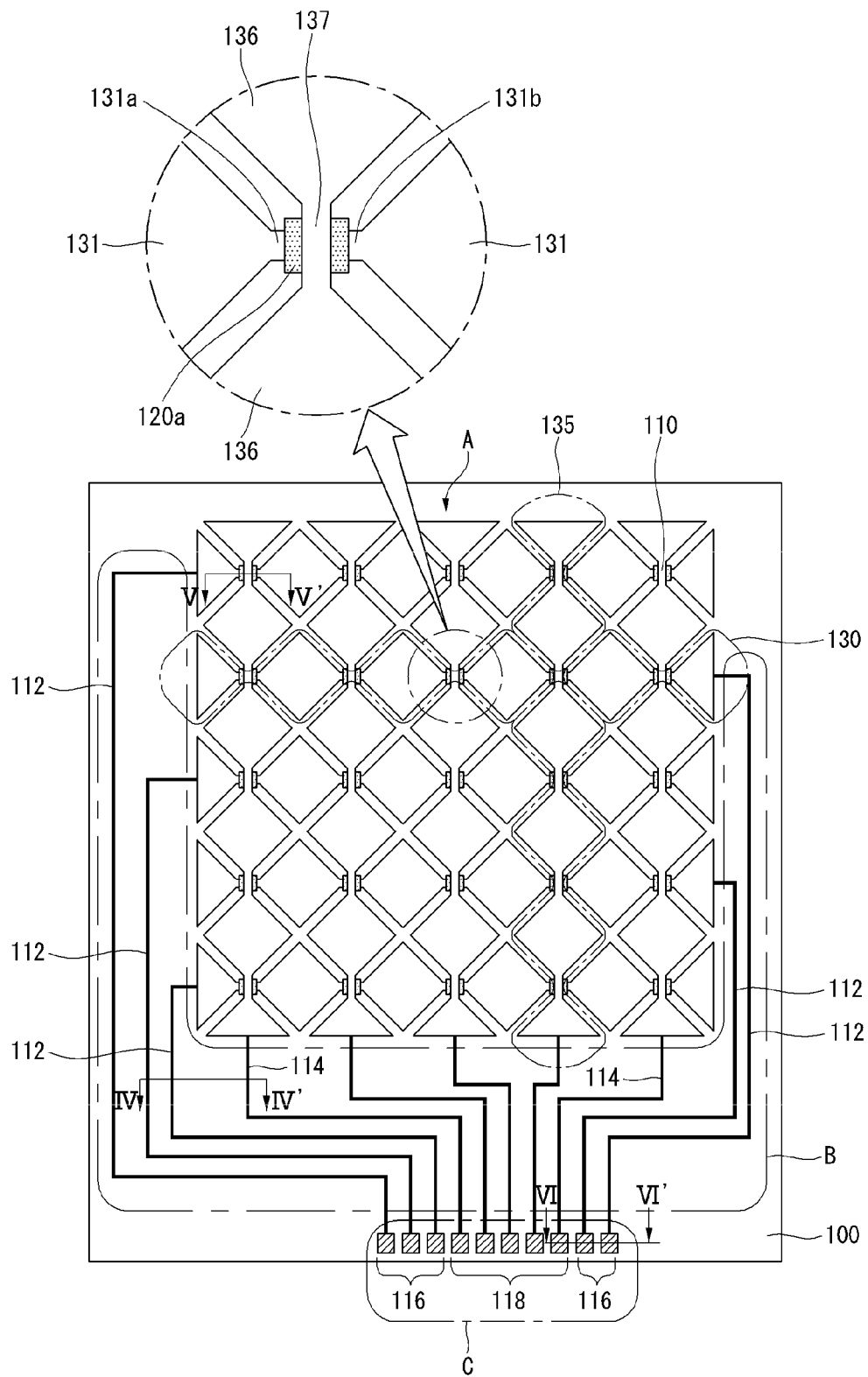
FIGS. 8A to 8D are a plan view and sectional views illustrating a third process of processes of manufacturing the touch screen panel shown in FIG. 4 according to the embodiment of this invention.

FIGS. 8A to 8D are a plan view and sectional views illustrating a process of manufacturing the electrode serials in the method of manufacturing the capacitive type touch screen panel according to the embodiment of this invention. FIG. 8A is a plan view illustrating the touch screen panel formed by the method of forming the electrode serials in the method of manufacturing the capacitive type touch screen panel according to the embodiment of this invention, and for a better understanding, in FIG. 8A, the insulation layer 120 formed in the routing wire forming part B is not shown.

Referring to FIGS. 8A to 8D, a Second conductive pattern group including a plurality of first electrode patterns 131, a plurality of second electrode patterns 136, and a plurality of second connection patterns 137 is formed in the electrode forming part A on the substrate 100 provided with the first connection patterns 110 and the first insulation patterns 120a, using a third photomask process. The plurality of first electrode patterns 131 are optionally arranged in parallel in a first direction (for example, an x-direction), and the plurality of second electrode patterns 136 and the second connection patterns 137 are optionally arranged in parallel in a second direction (for example, a y-direction) intersecting the first direction.

Figure 8B:
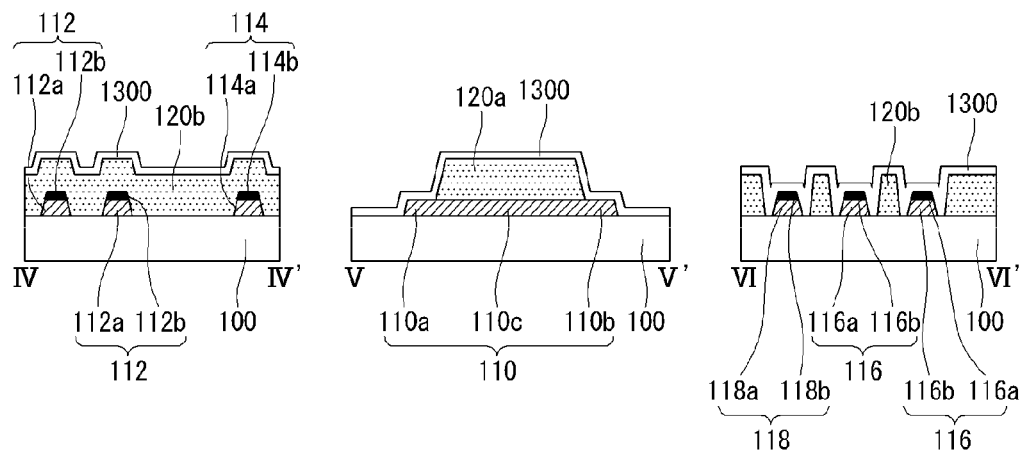

As shown in FIG. 8B, a third conductive layer 1300 is entirely deposited on the electrode forming part A, the routing wire forming part B, and the pad forming part C on the substrate 100 provided with the first connection pattern 100 and the first insulation pattern 120a, through a deposition process such as sputtering.

Figure 8C:
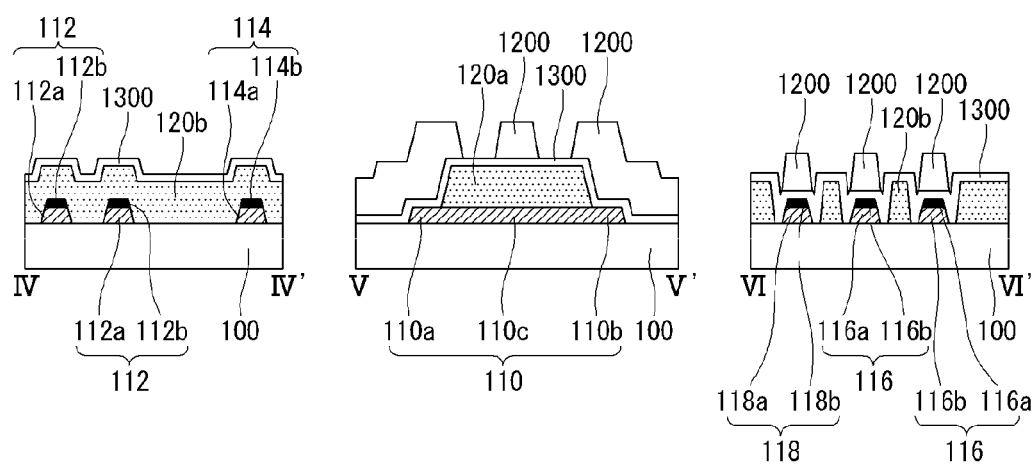

As shown in FIG. 8C, a photoresist pattern 1200 is formed through a photolithography process using the third photomask and disposed at positions where the first and second electrode patterns 131 and 136 will be formed and at positions where the first and second pads 116 and 118 will be formed. The third conductive layer 1300 at parts where the photoresist pattern 1200 is not disposed is removed by exposure, development, and etching processes, thereby forming third conductive patterns including the first and second electrode patterns 131 and 136, the second connection patterns 137, the upper layers 116c of the first pads, and the upper layer 118c of the second pad. Here, the second electrode serials 135 include the plurality of second electrode patterns 136 and the second connection patterns 137 connecting the neighboring second electrode patterns 136 to each other. The third conductive layer is made of transparent conductive material such as ITO or IZO.

As a result of the third photomask process, in the electrode forming part A of the touch screen panel, the first parts 131a of the first electrode patterns 131 are formed on the first parts 110a of the first connection patterns 110 and the lateral sides of a portions of upper surfaces of the first insulation patterns 120a. The second parts 131b of the first electrode patterns 131 are formed on the neighboring second parts 110b of the first connection patterns 110 and the lateral sides and a portion of upper surfaces of the first insulation patterns 120a. The central parts 131c between the first parts 131a and the second parts 131b of the first electrode patterns 131 are formed on the substrate 100. Therefore, the neighboring first electrode patterns 131 are electrically connected to each other via the first connection patterns 110.

Figure 8D:
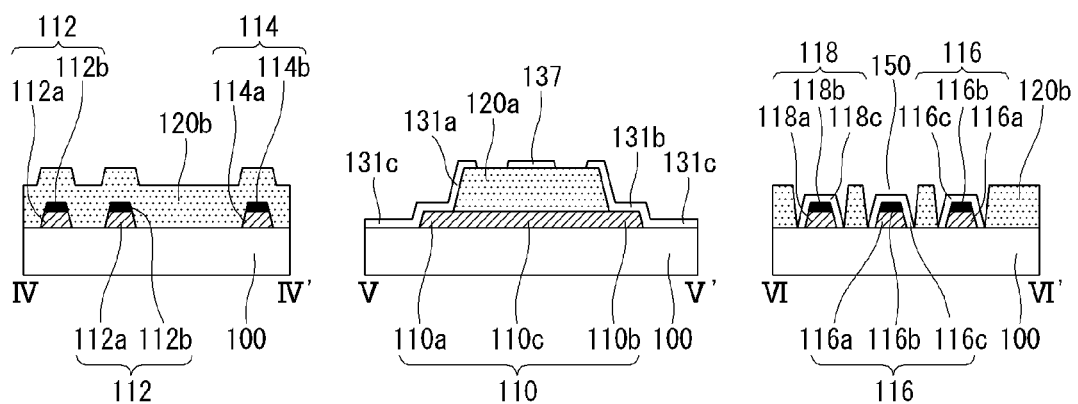

In addition, although FIG. 8D shows that the first parts 131a and the second parts 131b of the first electrode patterns 131 are respectively formed on the upper surfaces of the first and second parts 110a and 110b of the first connection patterns 110, and the lateral sides and upper surfaces of the first insulation patterns 120a, as shown in FIG. 5B, the first parts 131a' and the second parts 131b' of the first electrode patterns 131 may be formed on only the upper surfaces of the first and second parts 110a and 110b of the first connection patterns 110.

In the routing forming part B, for connection to the first electrode serials 130 and the second electrode serials 135, the second insulation patterns 120b are formed so as to expose a portion of the first routing wires 112 and a portion of the second routing wires 114. The end parts of the first electrode patterns 131 positioned at the outermost of the electrode forming part A are electrically connected to the exposed parts of the first routing wires 112. The end parts of the second electrode patterns 136 positioned at the outermost of the electrode forming part A are also electrically connected to the exposed parts of the second routing wires 114.

In the pad forming part C, the first pads 116 and the second pads 118 are formed in which the third layers 116c and 118c envelop the first and second layers 116a, 118a, 116b and 118b, respectively. As shown in FIG. 8D, in the pad forming part C, the first pads 116 and the second pads 118 are exposed via the contact holes 150 of the second insulation patterns 120b; however, the second insulation patterns 120b may not be formed. In the embodiment of this invention, the first and second pads 116 and 118 have a triple layer structure; however, the second layers may be omitted.

According to the method of manufacturing the touch screen panel of this invention described above, the first connection patterns 110, the lower layers 112a and 114a and the upper layers 112b and 114b of the first and second routing wires 112 and 114, and the first layers 116a and 118a and the second layers 116b and 118b of the first and second pads 116 and 118 can be formed through one same photomask process together, and thereby it is possible to further reduce one photomask as compared with the related art.

Since the electrode patterns and the connection patterns connecting the electrode patterns to each other are made of the same material, it is possible to prevent poor quality caused by contact resistance and static electricity.

The touch screen panel according to the embodiment of this invention may be applied to display devices including a liquid crystal display (LCD), a field emission display (FED), a plasma display panel (PDP), an electroluminescence device (EL), an electrophoresis display (EPD), and the like. In this case, the substrate of the touch screen panel according to the embodiment of this invention may be used as substrates of the display devices.

As described above, according to the capacitive type touch screen panel and the method of manufacturing the same, the routing wires having a double layer structure and the connection patterns having a single layer structure and connecting the neighboring electrode patterns can be formed through one photomask process using the half-tone photomask process, and thereby it is possible to reduce a cost and a tact time due to the decrease in the number of photomasks.

Moreover, since the touched electrodes (electrode patterns) and the connection patterns connecting the electrode patterns to each other are made of the same material, it is possible to prevent poor quality caused by contact resistance and static electricity.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A capacitive touch screen panel comprising:
a substrate;
a plurality of first electrode serials arranged in parallel in a first direction;

a plurality of second electrode serials arranged in parallel in a second direction and intersecting the first electrode serials;

a plurality of first routing wires and a plurality of second routing wires that are formed on the substrate at positions outside the plurality of first electrode serials and the plurality of second electrode serials, wherein the plurality of first routing wires are respectively connected to the plurality of first electrode serials and have a double layer structure of first and second conductive layers, and the plurality of second routing wires are respectively connected to the plurality of second electrode serials and have a double layer structure of the first and second conductive layers; and an insulation layer that electrically insulates the first electrode serials from the second electrode serials at an intersection of the first electrode serials and the second electrode serials, wherein each of the plurality of first electrode serials includes a plurality of first electrode patterns separated from each other and a plurality of first connection patterns, each of the first electrode patterns is formed on ends opposite to each other of the neighboring first connection patterns and is formed on the substrate between the ends, and the neighboring first electrode patterns are connected to each other via the first connection patterns respectively, and the plurality of first connection patterns are formed of the first conductive layer and are separate from each other, wherein the first conductive layer of the first routing wire, the first conductive layer of the second routing wire, and the first connection patterns are formed in the same layer, wherein each of the plurality of second electrode serials includes a plurality of second connection patterns and a plurality of second electrode patterns, the neighboring second electrode patterns are integrally and electrically connected to each other via the second connection patterns respectively, wherein the first electrode patterns and the plurality of second electrode serials including the second connection patterns and second electrode patterns are formed of the same third conductive layer, and wherein each of the first electrode patterns is formed on a lateral side of the insulation layer.

2. The capacitive touch screen panel of claim 1, wherein the first and third conductive layers include one of ITO and IZO.

3. The capacitive touch screen panel of claim 1, wherein the second conductive layer includes one of Al, AlNd, Mo, MoTi, Cu, CuOx, and Cr.

4. A capacitive touch screen panel comprising:
a substrate;
a plurality of first electrode serials arranged in parallel in a first direction;
a plurality of second electrode serials arranged in parallel in a second direction and intersecting the first electrode serials;
a plurality of first routing wires and a plurality of second routing wires that are formed on the substrate at positions outside the plurality of first electrode serials and the plurality of second electrode serials, wherein the plurality of first routing wires are respectively connected to the plurality of first electrode serials and have a double layer structure of first and second conductive layers, and the plurality of second routing wires are respectively connected to the plurality of second electrode serials and have a double layer structure of the first and second conductive layers; and
an insulation layer that electrically insulates the first electrode serials from the second electrode serials at an intersection of the first electrode serials and the second electrode serials,
wherein the first conductive layer of the first routing wire, the first conductive layer of the second routing wire, and first connection patterns are formed in the same layer,
wherein the first electrode serials and the plurality of second electrode serials are formed of the same third conductive layer, and
wherein each of the first electrode serials is formed on a lateral side of the insulation layer.

5. The capacitive touch screen panel of claim 4, wherein each of the plurality of first electrode serials includes a plurality of first electrode patterns separated from each other and a plurality of first connection patterns, each of the first electrode patterns is formed on ends opposite to each other of the neighboring first connection patterns and is formed on the substrate between the ends, and the neighboring first electrode patterns are connected to each other via the first connection patterns respectively, and the plurality of first connection patterns are formed of the first conductive layer and are separate from each other.

6. The capacitive touch screen panel of claim 4, wherein each of the plurality of second electrode serials includes a plurality of second connection patterns and a plurality of second electrode patterns, the neighboring second electrode patterns are integrally and electrically connected to each other via the second connection patterns respectively.

7. The capacitive touch screen panel of claim 4, wherein the first and third conductive layers include one of ITO and IZO.

8. The capacitive touch screen panel of claim 4, wherein the second conductive layer includes one of Al, AlNd, Mo, MoTi, Cu, CuOx, and Cr.

* * * * *